US011711240B1

(12) United States Patent
Liu et al.

(10) Patent No.: US 11,711,240 B1
(45) Date of Patent: Jul. 25, 2023

(54) METHOD TO PROVIDE BROADCAST/MULTICAST SUPPORT IN PUBLIC CLOUD

(71) Applicant: Cisco Technology, Inc., San Jose, CA (US)

(72) Inventors: Louis Zhijun Liu, Cupertino, CA (US); Andrew Ossipov, Lewisville, TX (US); Soumya Kalahasti, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 98 days.

(21) Appl. No.: 17/491,199

(22) Filed: Sep. 30, 2021

(51) Int. Cl.
| | |
|---|---|
| *H04L 12/46* | (2006.01) |
| *H04L 45/64* | (2022.01) |
| *H04L 49/201* | (2022.01) |
| *H04L 101/668* | (2022.01) |
| *H04L 101/695* | (2022.01) |

(52) U.S. Cl.
CPC ...... *H04L 12/4641* (2013.01); *H04L 12/4633* (2013.01); *H04L 45/64* (2013.01); *H04L 49/201* (2013.01); *H04L 2101/668* (2022.05); *H04L 2101/695* (2022.05)

(58) Field of Classification Search
None
See application file for complete search history.

(56) References Cited

U.S. PATENT DOCUMENTS

| | | | |
|---|---|---|---|
| 10,103,902 B1 | 10/2018 | Sampath et al. | |
| 11,252,192 B1 * | 2/2022 | Kwan | H04L 63/20 |
| 2014/0123212 A1 * | 5/2014 | Wanser | H04L 63/20 |
| | | | 726/1 |
| 2015/0188728 A1 * | 7/2015 | Byun | H04L 45/66 |
| | | | 370/254 |
| 2016/0330125 A1 * | 11/2016 | Mekkattuparamban | |
| | | | H04L 45/32 |
| 2017/0099187 A1 * | 4/2017 | Dale | H04L 41/0893 |
| 2019/0268383 A1 * | 8/2019 | Maino | H04L 63/0281 |
| 2019/0273626 A1 | 9/2019 | Iszlai et al. | |
| 2020/0382412 A1 | 12/2020 | Chandrappa et al. | |
| 2021/0160173 A1 * | 5/2021 | Biradar | H04L 43/0841 |
| 2021/0288935 A1 * | 9/2021 | Inayethulla | H04L 63/0876 |

FOREIGN PATENT DOCUMENTS

CN 106656722 A 5/2017

OTHER PUBLICATIONS

Kar, Sabyasachi, "Virtual Extensible LAN and Ethernet Virtual Private Network," Cisco, 48 pages.

* cited by examiner

*Primary Examiner* — Kenny S Lin
(74) *Attorney, Agent, or Firm* — Lee & Hayes, P.C.

(57) ABSTRACT

Techniques and architecture are described for providing broadcast/multicast support using VXLAN in and among private on-premises/cloud networks and public cloud networks by defining peer groups comprising VXLAN tunnel endpoints (VTEPs) within clustered network security devices. For example, a static peer group comprising two or more virtual extensible local access network (VXLAN) tunnel end points (VTEPs) is defined. The two or more VTEPs may each comprise a data interface of a network security device. Based at least in part on the static peer group, an overlay network comprising the two or more VTEPs is defined. A network security device discovers available VTEPs within the static peer group. The network security device establishes a mesh network of available VTEPs.

20 Claims, 6 Drawing Sheets

FIG. 1

Multi-node Network Security Device Clustering Configuration – Static Peer Group

```
interface Port-channel 6
 nve-only cluster 202
 nameif vtep-ifc
 ip address 10.1.1.1 255.255.255.0 object-group network cluster  204
 network-object   host    10.1.1.1
 network-object   host    10.1.1.2
 network-object   host    10.1.1.3
 network-object host 10.1.1.4 … interface vni1  210
 description Clustering Interface
 segment-id 1  206
 vtep-nve 1  208 nve 1  212
 encapsulation vxlan  214
 source-interface vtep-ifc  216
 peer-group cluster  218 cluster group Network Security Device-
 local-unit A
 cluster-interface vni1 ip 1.1.1.1              220
 priority 1
 …… ip local pool inside_pool 3.3.3.11-3.3.3.14
ip local pool outside_pool 4.4.4.11-4.4.4.14 interface GigabitEthernet0/1
 nameif inside
 security-level 100
 ip address 3.3.3.1 255.255.255.0 cluster-pool 222 inside_pool interface GigabitEthernet0/2
 nameif outside
 security-level 0
 ip address 4.4.4.1 255.255.255.0 cluster-pool 224 outside_pool
```

```
┌─────────────────────────────────────────────────────────────┐
│  DEFINE A STATIC PEER GROUP COMPRISING TWO OR MORE VIRTUAL  │
│    EXTENSIBLE LOCAL ACCESS NETWORK (VXLAN) TUNNEL END       │
│                       POINTS (VTEPs)                        │
│                             502                             │
└─────────────────────────────────────────────────────────────┘
                              │
                              ▼
┌─────────────────────────────────────────────────────────────┐
│  BASED AT LEAST IN PART ON THE STATIC PEER GROUP, DEFINE AN │
│       OVERLAY NETWORK COMPRISING THE TWO OR MORE VTEPs      │
│                             504                             │
└─────────────────────────────────────────────────────────────┘
                              │
                              ▼
┌─────────────────────────────────────────────────────────────┐
│  DISCOVER, BY A NETWORK SECURITY DEVICE, AVAILABLE VTEPs    │
│              WITHIN THE STATIC PEER GROUP                   │
│                             506                             │
└─────────────────────────────────────────────────────────────┘
                              │
                              ▼
┌─────────────────────────────────────────────────────────────┐
│  ESTABLISH, BY THE NETWORK SECURITY DEVICE, A MESH NETWORK  │
│                    OF AVAILABLE VTEPs                       │
│                             508                             │
└─────────────────────────────────────────────────────────────┘
```

METHOD TO PROVIDE BROADCAST/MULTICAST SUPPORT IN PUBLIC CLOUD

TECHNICAL FIELD

The present disclosure relates generally to providing broadcast/multicast domains in public cloud and private cloud/on-premises using VxLAN (virtual extensible local access network) and Geneve (Generic Network Virtualization Encapsulation). This may done by providing VXLAN multicast support in and among private on-premises/cloud networks and public cloud networks by defining peer groups comprising VXLAN tunnel endpoints (VTEPs) within clustered network security devices.

BACKGROUND

Most public cloud providers such as Azure, AWS or GCP support auto-scaling for network security devices. While cloud security services provide high scalability, cloud security services generally lack stateful high availability support across multiple device instances. Certain network security devices provide both scalability and high availability. However, such network security devices generally only support clustering in physical platforms. Thus, it is desirable to leverage a clustering design of network security devices to support both cloud auto-scaling and high availability.

For such a scenario, the cluster control link (CCL) subnet needs to be isolated and dedicated. Also, traditional clustering requires layer 2/layer 3 (L2/L3) broadcast support for the CCL subnet. However, public cloud providers such as Azure, AWS and GCP may not support broadcast or multicast in all relevant deployment scenarios. Furthermore, broadcast support is not always available or practical in private clouds, e.g., on-premises networks.

In particular, some implementations of the current network virtualization protocols such as, for example, virtual extensible local access network (VXLAN) and Generic Network Virtualization Encapsulation (Geneve) only support two peer discovery mechanisms: static peer internet protocol (IP) and IP multicast group. Thus, a user needs to configure remote VXLAN tunnel endpoints (VTEPs) IP statically or needs to rely on an IP multicast group to discover the VTEP neighbors. However, as previously noted, public clouds such as Azure, AWS and GCP may not support IP broadcast or multicast in their network fabrics. This greatly constrains the application of network virtualization protocols in public clouds.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure describes techniques and architecture for providing broadcast/multicast domains through virtual extensible local access network (VXLAN) and Generic Network Virtualization Encapsulation (Geneve) multicast support in public cloud networks. In particular, the techniques and architecture provide VXLAN multicast support in and among private cloud/on-premises networks and public cloud networks by defining peer groups comprising VXLAN tunnel endpoints (VTEPs) comprising network security devices. As is known, VXLAN and Geneve are similar tunneling protocols. For clarity and simplicity, the techniques and architecture are described herein primarily with respect to VXLAN based clustering, although Geneve is an alternative tunneling protocol and with minimal effort, Geneve based clustering may be implemented.

In configurations, a network topology includes data centers, where the network topology is virtualized in accordance with the VXLAN protocol. In some configurations, network topology may include one or more embedded networks. For example, one or more of the data centers may be part of a first network, e.g., a private cloud network or on-premises network, while one or more of the data centers may be a part of a second network, e.g., a public cloud network. In configurations, the first network may also be a public cloud network that is different than the second network. In configurations, all of the data centers may be part of the same network, e.g., all of the data centers may be part of the first network, or all of the data centers may be part of the second network.

Any combination of one or more data centers may be and typically is physically remotely located relative to a remaining combination of the data centers. Nevertheless, data centers are communicatively coupled to one another facilitating network traffic flow between one another through respective network elements. Data centers include (network) routers. For example, each of the data centers includes a respective router. It is understood that any number of routers may be, and typically are, employed by each data center.

In configurations, each data center includes one or more unified computing systems (UCS) that serve as hosts within the corresponding data center. A UCS is a converged data center architecture that integrates computing, networking and storage resources to increase efficiency and enable centralized management. A UCS is designed and configured to work together effectively. The goal of a UCS is to simplify the number of devices that need to be connected, configured, cooled and secured while providing administrators with the ability to manage everything through a single graphical interface. A UCS has the ability to support traditional operating systems (OS) and application stacks in physical environments but is optimized for virtualized environments. A UCS may be managed with a software application that allows administrators to provision the server, storage and network resources all at once from a single user interface.

Each UCS includes one or more virtual machines and a network device configured as a network security device, e.g., a firewall. Each UCS further includes a virtual switch (vSwitch) coupled to an edge router of the corresponding data center. Open vSwitch is an example of a software-based virtual network switch that supports VXLAN overlay networks. While the data centers are described as including UCSs, it is to be understood that individual components and network devices may be utilized instead. Additionally, the data centers may, and generally do, include additional components and/or network devices not mentioned.

Data or network packets travel within and between the datacenters among the UCSs, e.g., inter-host cluster control link (CCL) traffic. Clustering allows for grouping multiple network security devices together as a single logical device.

The inter-host CCL traffic may be controlled by the network security devices and the virtual switches. The edge routers route data packets to one or more of the data centers within a corresponding network, e.g., first network or second network along inter-data center links via the L3 network. The edge routers also route data packets to one or more of the data centers within a different network, e.g., between the first network and the second network, along inter-network links. Cluster control link traffic is comprised mainly of state update and forwarded data packets. The amount of traffic at any given time on the cluster control link varies. The amount of forwarded traffic depends on the load-balancing efficacy or whether there is a lot of traffic for centralized features.

As previously noted, the network is a virtualized network. The network may include a private cloud/on-premises network portion and/or one or more public cloud network portions. VXLAN is a network virtualization technology that attempts to address the scalability problems associated with large cloud computing deployments. VXLAN uses a VLAN-like encapsulation technique to encapsulate Open Systems Interconnection (OSI) layer 2 (L2) Ethernet frames within layer 4 (L4) user datagram protocol (UDP) datagrams, using 4789 as the default IANA-assigned destination UDP port number. VXLAN endpoints, which terminate VXLAN tunnels and may be either virtual or physical switch ports, are known as VXLAN tunnel endpoints (VTEPs). VXLAN is an evolution of efforts to standardize on an overlay encapsulation protocol. Compared to VLAN, which provides limited number of layer-2 VLANs (typically using 12-bit VLAN ID), VXLAN increases scalability up to 16 million logical networks (with 24-bit VNID) and allows for layer-2 adjacency across IP networks. Multicast or unicast with head-end replication (HER) is used to flood broadcast, unknown-unicast and multicast traffic (BUM traffic). Broadcast traffic is used to transmit a message to any reachable destination in the network without the need to know any information about the receiving party. When broadcast traffic is received by a network switch, it is replicated to all ports within the respective VLAN except the port from which the traffic originated. Unknown-unicast traffic occurs when a switch receives unicast traffic intended to be delivered to a destination that is not in its forwarding information base. In such a scenario, the switch marks the frame for flooding and sends it to all forwarding ports within the respective VLAN. Multicast traffic allows a host to contact a subset of hosts or devices joined into a group. This causes the message to be broadcast when no group management mechanism is present.

In configurations, after the network is virtualized, data interfaces are dedicated as VTEPs. The data interfaces may be located in network devices, and in configurations, network security devices, e.g., network security devices that provide, for example, firewall protection. In configurations, the cluster control link (CCL) traffic is clustered and VXLAN tunnel encapsulated. Briefly, VXLAN is a simple tunneling mechanism that allows overlaying a L2 network over a L3 underlay with the use of any internet protocol (IP) routing protocol. VXLAN uses medium access control (MAC) address-in-user datagram protocol (MAC-in-UDP) encapsulation. A remote device encapsulates the filtered traffic, adds an encapsulation header that consists of L2+IP+ UDP+VXLAN headers.

In configurations, a group of peers, referred to herein as a static peer group, is defined. The static peer group may be defined by a user. In configurations, the static peer group may comprise VTEPs. The VTEPs may be part of a first network (first network portion), e.g., a private cloud network or a public cloud network, that includes one or more data centers and/or a second network (second network portion), e.g., a public cloud network, that includes one or more data centers. The static peer group may be defined by the user to include VTEPs from both the first network and the second network. The user may create an L3 overlay network with the selected VTEP peers, e.g. the static peer group. The user may define the static peer with a network object group of selected remote IP addresses. The user may also define the static peer group as comprising a range of IP addresses. The user may also define the static peer group as comprising a subnet of IP addresses in the overlay network. Network devices, e.g., network security devices, may mimic broadcast by using unicast, discover available peers, e.g., VTEPs and establish a mesh network of available peers, e.g., VTEPs. Once the static peer groups are defined and discovered, they may be used by the network security devices for multicast and broadcast transmission of CCL traffic.

As an example, a method may include defining a static peer group comprising two or more virtual extensible local access network (VXLAN) tunnel end points (VTEPs). The two or more VTEPs may each comprise a data interface. The method may further include based at least in part on the static peer group, defining an overlay network comprising the two or more VTEPs. The method may also include discovering, by a network security device, available VTEPs within the static peer group. The method may additionally include establishing, by the network security device, a mesh network of available VTEPs.

In configurations, discovering, by the network security device, available VTEPs within the static peer group comprises mimicking broadcast using unicast. In configurations, defining the static peer group comprises two or more VTEPs comprises defining the static peer group comprising (i) at least one VTEP having a first internet protocol (IP) address in a first network and (ii) at least one VTEP having a second internet protocol (IP) address in a first public cloud network different from the first network. In configurations, the first network is an on-premises network. In other configurations, the first network is a second public cloud network.

In some configurations, defining the static peer group comprises defining, within the overlay network, a network object group of IP addresses within at least one of a first network or a first public cloud network. In some configurations, defining the static peer group comprises defining, within the overlay network, a range of IP addresses within at least one of a first network or a first public cloud network.

In some configurations, defining the static peer group comprises defining, within the overlay network, a subnet of IP addresses within at least one of a first network or a first public cloud network. In some configurations, each data interface is located within a corresponding network security device.

The techniques described herein may be performed by a system and/or device having non-transitory computer-readable media storing computer-executable instructions that, when executed by one or more processors, performs the method described above.

Example Embodiments

As previously noted, in configurations, network virtualization is applied to a network. The network may include a private cloud/on-premises network portion and/or one or more public cloud network portions. VXLAN is virtualization technology and is meant to provide the same service to connected ethernet end systems that VLAN does, but in a more extensible manner. Compared to VLAN, VXLAN is extensible with regards to scale the reach of its deployment.

As previously noted, in configurations, after the network is virtualized, data interfaces are dedicated as VTEPs. VXLAN uses VTEP devices in order to map end devices to VXLAN segments and in order to perform VXLAN encapsulation and decapsulation. Each VTEP has two interfaces: (i) a switch interface on a local LAN segment to support local endpoint communication through bridging and (ii) an IP interface to the transport IP network.

The data interfaces may be located in network devices, and in configurations, network security devices, e.g., network security devices that provide, for example, firewall protection. In configurations, the cluster control link (CCL) traffic is VXLAN tunnel encapsulated.

As previously noted, in configurations, a group of peers, referred to herein as a static peer group, is defined. The static peer group may be defined by a user. In configurations, the static peer group may comprise VTEPs. The VTEPs may be part of a first network (first network portion), e.g., a private cloud network or a public cloud network, that includes one or more data centers and a second network (e.g., second network portion), e.g., a public cloud network, that includes one or more data centers. The static peer group may be defined by the user to include VTEPs from both the first network and the second network.

The user may create an L3 overlay network with the selected VTEP peers, e.g. the static peer group. VXLAN is a L2 overlay scheme over a L3 network. VXLAN uses MAC addresses in UDP encapsulation to provide a means to extend L2 segments across the data center network. VXLAN defines a MAC-in-UDP encapsulation scheme where the original L2 frame has a VXLAN header added and is then placed in a UDP IP packet. With this MAC-in-UDP encapsulation, VXLAN tunnels the L2 network over the L3 network.

The user may define the static peer with a network object group of selected remote IP addresses. The user may also define the static peer group comprising a range of IP addresses. The user may also define the static peer group as comprising a subnet of IP addresses in the overlay network. Network devices, e.g., network security devices, may mimic broadcast by using unicast, discover available peers, e.g., VTEPs and establish a mesh network of available peers, e.g., VTEPs. Once the static peer groups are defined and discovered, the may be used by the network security devices for multicast and broadcast transmission of CCL traffic.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
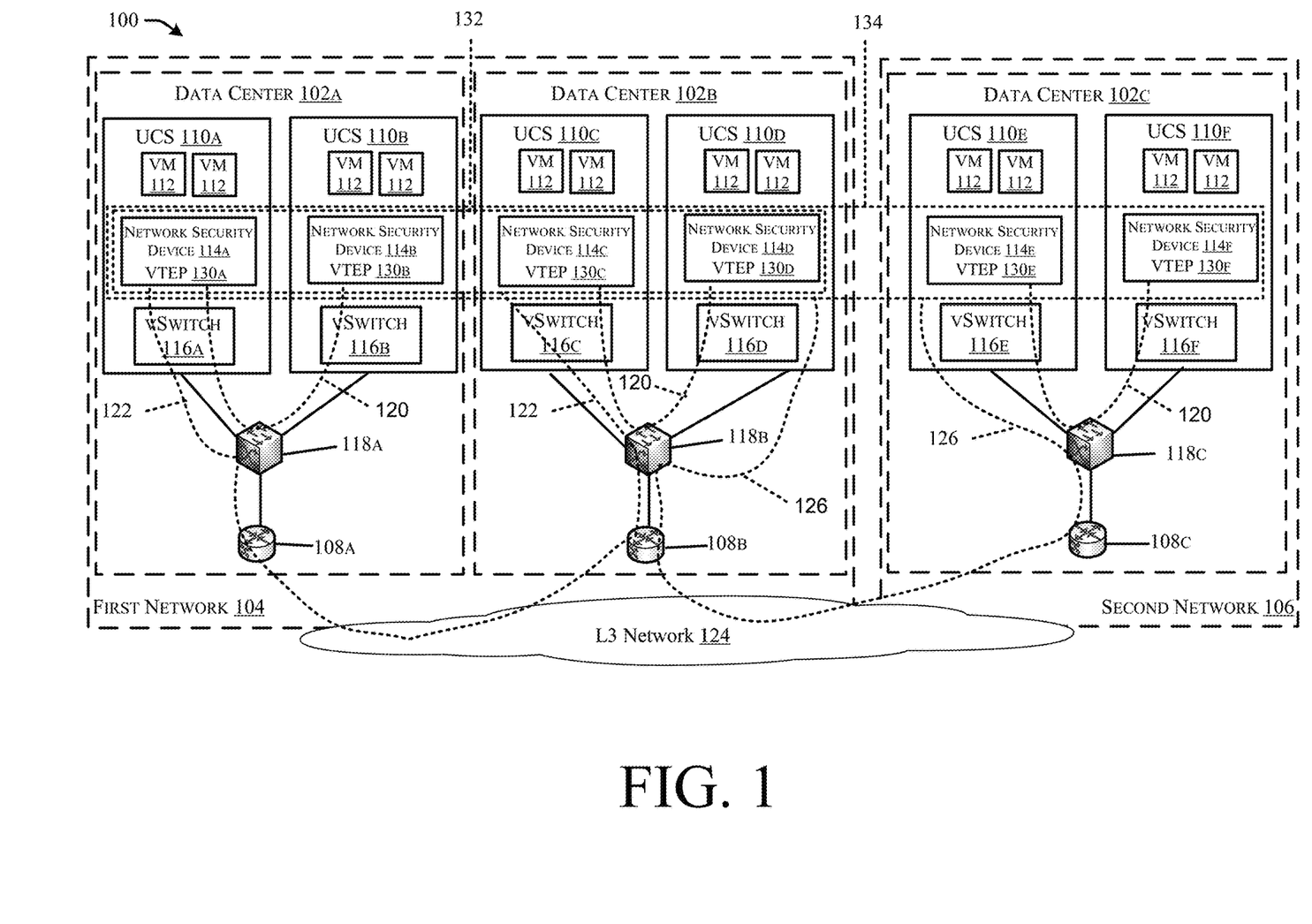
FIG. 1 schematically illustrates an example network topology that includes data centers, where the network topology is virtualized in accordance with the VXLAN protocol.

FIG. 1 schematically illustrates a network topology 100 that includes data centers 102, where the network topology 100 is virtualized in accordance with the VXLAN protocol. In some configurations, network topology 100 may include one or more embedded networks. For example, one or more of the data centers 102 may be part of a first network 104, e.g., a private cloud network or on-premises network, while one or more of the data centers 102 may be a part of a second network 104, e.g., a public cloud network. In configurations, the first network 104 may also be a public cloud network that is different than the second network 106. In configurations, all of the data centers 102 may be part of the same network, e.g., all of the data centers 102 may be part of first network 104 or all of the data centers 102 may be part of second network 106.

For purposes of illustration, data centers 102 are shown to include a total of three distinct data centers 102 identified in FIG. 1 as data centers 102a-102c, although it is understood that any number of data centers may be employed. Any combination of one or more data centers of the data centers 102 may be and typically is physically remotely located relative to a remaining combination of the data centers 102. Nevertheless, data centers 102 are communicatively coupled to one another facilitating network traffic flow between one another through respective network elements. Data centers 102 are shown to include (network) routers 108. For example, each of data centers 102a-102c includes a respective one of routers 108a-108c. While a single router 108 is shown in each data center in FIG. 1, it is understood that any number of routers 108 may be, and typically are, employed by each data center 102.

In configurations, each data center 102 includes one or more unified computing systems (UCS) 110 that serve as hosts within the corresponding data center 102. Thus, in the example network topology of FIG. 1, there six UCSs 110a-110f.

Each UCS 110 includes one or more virtual machines 112 and a network device configured as a network security device 112, e.g., a firewall. Each UCS 110 further includes a virtual switch (vSwitch) 116 coupled to an edge router 118a-c of a corresponding data center 102a-c. Open vSwitch is an example of a software-based virtual network switch that supports VXLAN overlay networks. While the data centers 102 are illustrated as including UCSs 110, it is to be understood that individual components and network devices may be utilized instead. Additionally, the data centers 102 may, and generally do, include additional components and/or network devices not illustrated in FIG. 1.

CCL traffic travels within the data centers 102 among the UCSs 110, e.g., inter-host CCL traffic 120. The inter-host CCL traffic 120 may be controlled and routed by the network security devices 114, the virtual switches 116, and the edge routers 118.

CCL traffic also travels between the data centers 102, e.g., inter-data center CCL traffic 122, as will be described further herein. The inter-data center CCL traffic 122 may be controlled and routed by the network security devices 114, the virtual switches 116, and the edge routers 118. The edge routers 118 and routers 108 route data packets to one or more of the data centers 102 within a corresponding network, e.g., first network 104 or second network 106, via the L3 network 124.

CCL traffic also travels between the first and second networks 104, 106 among the UCSs 110, e.g., inter-network CCL traffic 126, as will be described further herein. The inter-network CCL traffic 126 may be controlled and routed by the network security devices 114, the virtual switches 116, and the edge routers 118. The edge routers 118 and routers 108 route data packets to one or more of the data centers 102 within a different network, e.g., first network 104 or second network 106, via the L3 network 124.

In configurations, data interfaces of the network security devices 114 are dedicated as VTEPs 130. In configurations, the CCL traffic in the form of data packets is VXLAN tunnel encapsulated. As previously noted, VXLAN is a simple tunneling mechanism that allows overlaying a L2 network over a L3 underlay with the use of any internet protocol (IP) routing protocol. VXLAN uses medium access control (MAC) address-in-user datagram protocol (MAC-in-UDP) encapsulation. A remote device encapsulates the filtered traffic, adds an encapsulation header that consists of L2+IP+ UDP+VXLAN headers.

In configurations, a group of peers, referred to herein as a static peer group, is defined. The static peer group may be defined by a user. In configurations, a first static peer group 132 may be defined that comprises VTEPs 130a-130d that are part of the first network 104, e.g., a private cloud/on-premises network or a public cloud network, and thus may represent an inter-data center cluster or static peer group. The inter-data center CCL traffic 122 is based on the first static peer group 132 and may be transmitted as a multicast or broadcast transmission via the L3 network 124.

A second static peer group 134 may be defined that includes one or more VTEPs 130 of the first static peer group 132 (illustrated in FIG. 1 as including all four VTEPS of the first static peer group 132) and VTEPs 130e and 130f that are part of the second network 106, e.g., a public cloud network, and thus may represent an inter-network cluster or static peer group. The inter-network CCL traffic 126 is based on the second static peer group 134 and may be transmitted as a multicast or broadcast transmission via the L3 network 124.

Thus, the static peer groups 132, 134 may be defined by the user to include VTEPs 130 from both the first network 104 and the second network 106, or just one of the networks 104, 106. The user may create an L3 overlay network with the selected VTEP peers, e.g. the static peer groups 132, 134.

In configurations, the user may define the static peer groups 132, 134 with a network object group of selected remote IP addresses of interfaces, e.g., VTEPs 130. The user may also define the static peer groups 132, 134 as comprising a range of IP addresses of interfaces, e.g., VTEPs 130. Table 1 below illustrates an example of defining static peer groups 132, 134 using a network object group.

In configurations, the user may also define the static peer groups 132, 134 as comprising a subnet of IP addresses of the interfaces, e.g., VTEPs 130, in the overlay network. Network security devices 114 may mimic broadcast by using unicast and discover available peers, e.g., VTEPs 130 in the form of interfaces, e.g., VTEPs 130. The network security devices 114 may establish a mesh network of available peers, e.g., the defined static peer groups 132, 134 of VTEPs 130 in the form of interfaces. The static peer groups 132, 134 have multicast and broadcast support regardless of the type of network in which a member of the static peer group 132, 134 is located.

Figure 2:
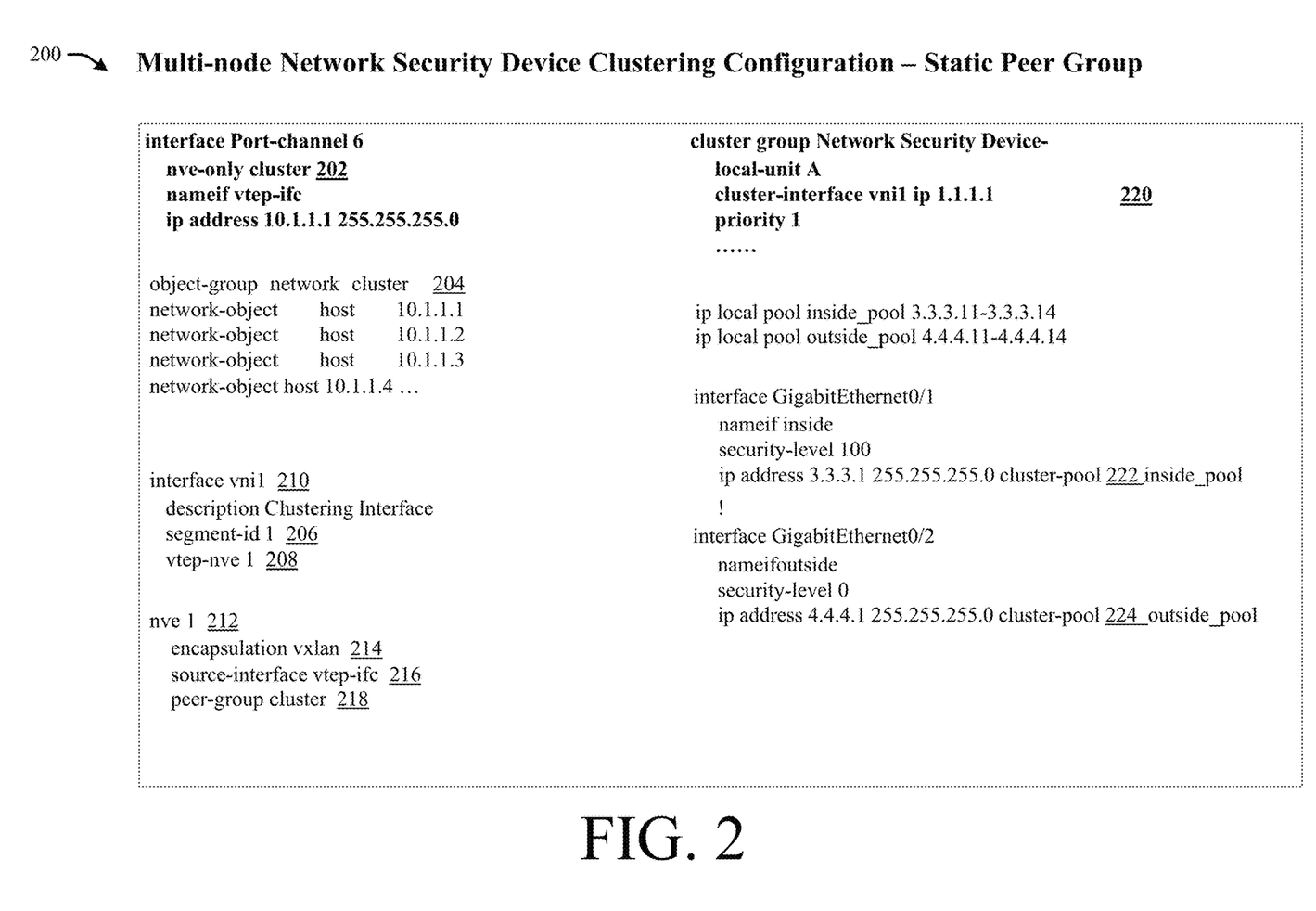
FIG. 2 illustrates an example of a multi-node clustering configuration of a static peer group for the example network topology of FIG. 1.

FIG. 2 illustrates an example of a multi-node clustering configuration of a static peer group 200. A network virtual endpoint (nve)-only cluster 202 is defined at interface port-channel 6 having an IP address of 10.1.1.1 255.255.255.0. An object-group network cluster 204 is defined. A segment-id 1 206 and vtep-nve-1 208 is defined at interface vnil 210. NVE 1 212 defines encapsulation VXLAN 214, source-interface vtep-ifc 216, and peer-group cluster 218, e.g., object-group network cluster 204. The cluster group security device-cluster 220 provides the cluster-interface vnil ip 1.1.1.1 255.255.255.0. The interface GigabitEthernet0/1 defines the ip address 3.3.3.1 255.255.255.0 cluster-pool inside_pool, with the cluster-pool 222 being added in configurations. The interface GigabitEthernet0/2 defines the ip address 4.4.4.1 255.255.255.0 cluster-pool outside_pool, with the cluster-pool 224 being added in configurations.

Figure 3:
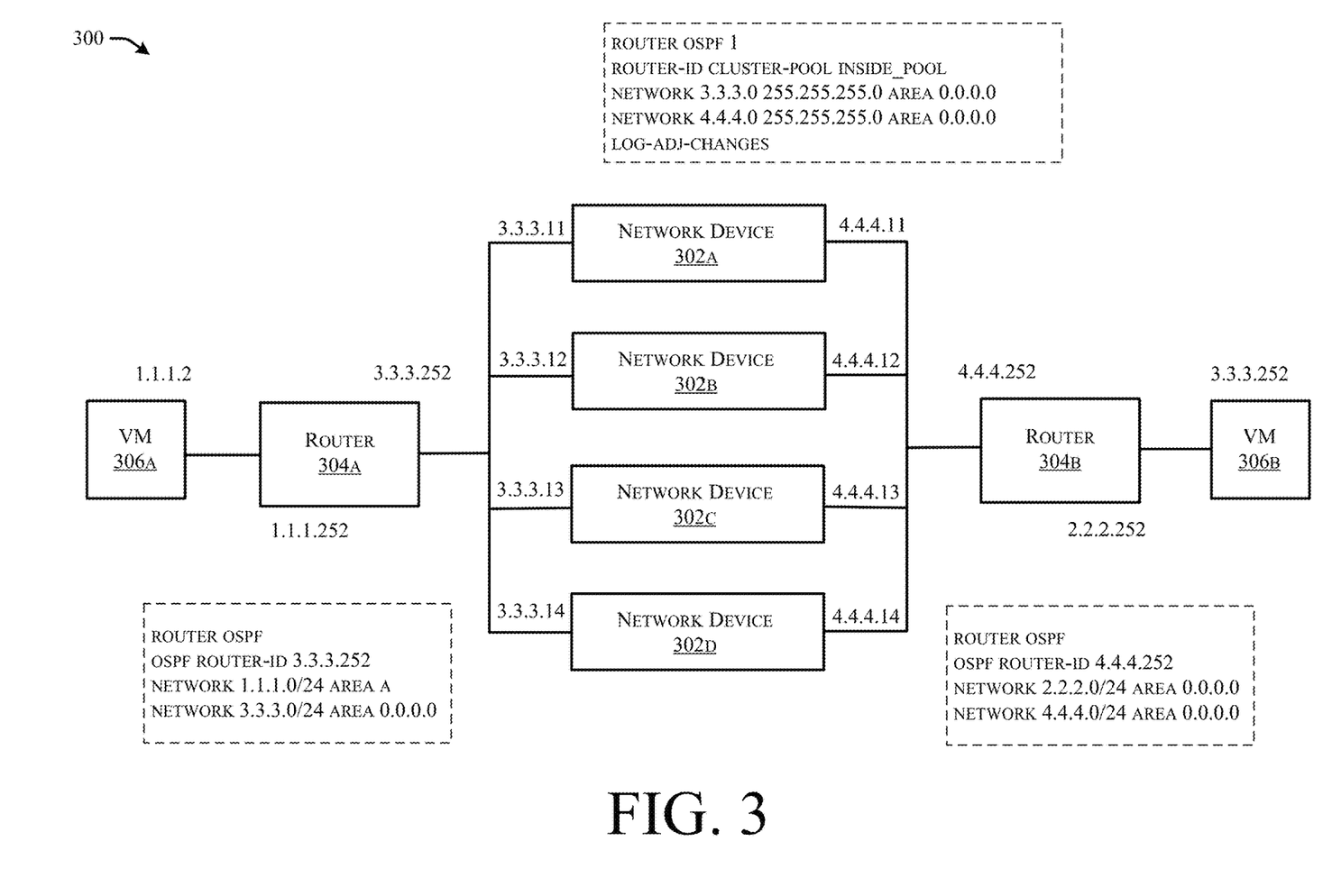
FIG. 3 schematically illustrates an example topology of a UCS included in the network topology of FIG. 1.

FIG. 3 schematically illustrates an example topology 300 of a UCS that includes 4 network devices 302a-302d, 2 routers 304a, 304b, and 2 virtual machines 306a, 306b. The network devices 302a-302d are clustered. The ip local pool inside_pool ranges from 3.3.3.11-3.3.3.14. The ip local outside pool ranges from 4.4.4.11-4.4.4.14.

For a maximum transmission unit (MTU) with VXLAN, VXLAN adds 50 bytes to the original ethernet frame. The CCL MTU needs to be 100 bytes greater than the data interface MTU. With VXLAN encapsulation overhead, an additional 54 bytes for the VTEP 130 interface is needed. The MTU in a public cloud network is generally 1500 bytes. Thus, in configurations, the MTU consideration in a public cloud network includes 1500 bytes for VTEP interfaces, 1446 bytes in CCL interfaces, and 1346 bytes or less in data interfaces.

Figure 4:
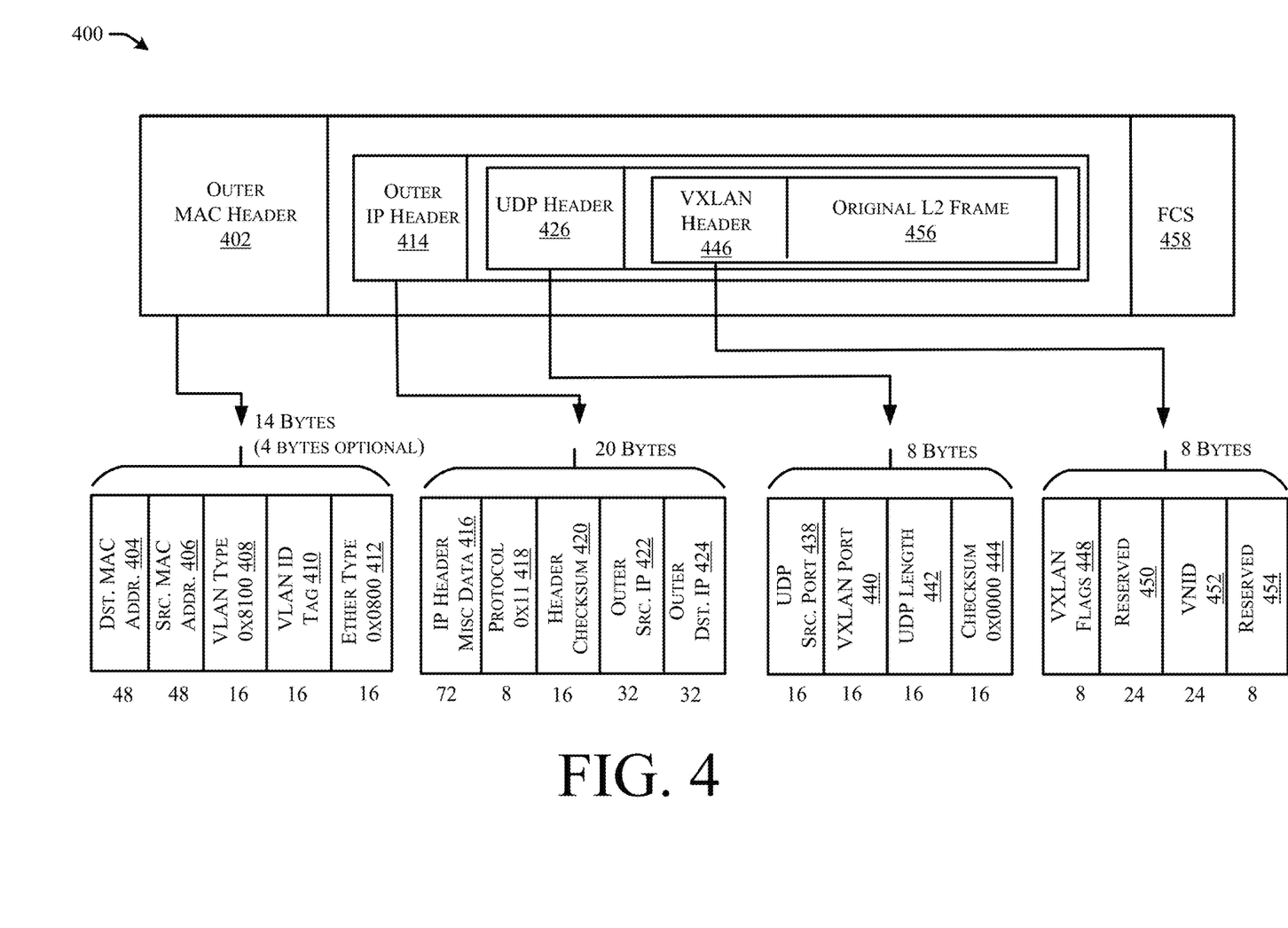
FIG. 4 schematically illustrates an example header for a maximum transmission unit (MTU) with VXLAN.

For example, with respect to FIG. 4, an example header 400 for a MTU may comprise 46-50 bytes (4 bytes optional). The header 400 may comprise an outer MAC header 402 that may comprise 10 to 14 bytes (4 bytes optional). The outer MAC header 402 may comprise a destination MAC address 404 that may comprise 48 bits, a source MAC header 406 that may comprise 48 bits, a VLAN type 408 that may comprises 16 bits, a VLAN ID tag 410 that may comprise 16 bits, and a ether type 412 that may comprise 16 bits. The example header 400 may also comprise an outer IP header 414 that may comprise 20 bytes. The outer IP header 414 may comprise an IP header with miscellaneous data 416 that may comprise 72 bits, a protocol 418 that may comprise 8 bits, a header checksum 420 that may comprise 16 bits, an outer source IP 422 that may comprise 32 bits, and an outer destination IP 424 that may comprise 32 bits. The header 400 may further comprise a UDP header 426 that may comprise 8 bytes. The UDP header 426 may comprise a UDP source port 438 that may comprise 16 bits, a VXLAN port 440 that may comprise 16 bits, a UDP length 442 that may comprise 16 bits, and a checksum 444 that may also comprise 16 bits. The header 400 may also comprise a VXLAN header 446 that may comprise 8 bytes. The VXLAN header 446 may comprise a VXLAN Flags 448 (which are mostly reserved) that may comprise 8 bits, a reserved section 450 that may comprise 24 bits, a VNID 452 that may comprise 24 bits, and another reserved section 454 that may comprise 8 bits. The header 400 may also comprise the original L2 frame 456 and a FCS 458.

Thus, the techniques and architecture described herein allow for broadcast and multicast clustering support in L3 in private cloud/on-premises networks by defining static peer groups of VTEPs of interfaces in network security devices. The techniques and architecture described herein also allow for broadcast and multicast clustering support in L3 in public cloud networks by defining static peer groups of VTEPs of interfaces in network security devices. The techniques and architecture described herein also allow for broadcast and multicast clustering support in L3 in between private cloud/on premises networks and public cloud networks by defining static peer groups of VTEPs of interfaces in network security devices.

While techniques and architecture have been described with examples and configurations related to VXLAN, the techniques and architecture are also applicable to other protocols, such as, for example, Geneve, e.g., Geneve may replace VXLAN as another tunnel protocol. Examples of other alternatives may include generic routing encapsulation (GRE), Internet protocol security (IPSec) tunnel, etc. The application of the L2 overlay over L3 network may be used to support applications and protocols such as Enhanced Interior Gateway Routing Protocol (EIGRP), Open Shortest Path First (OSPF), etc., which rely on broadcast/multicast in the public cloud.

Figure 5:
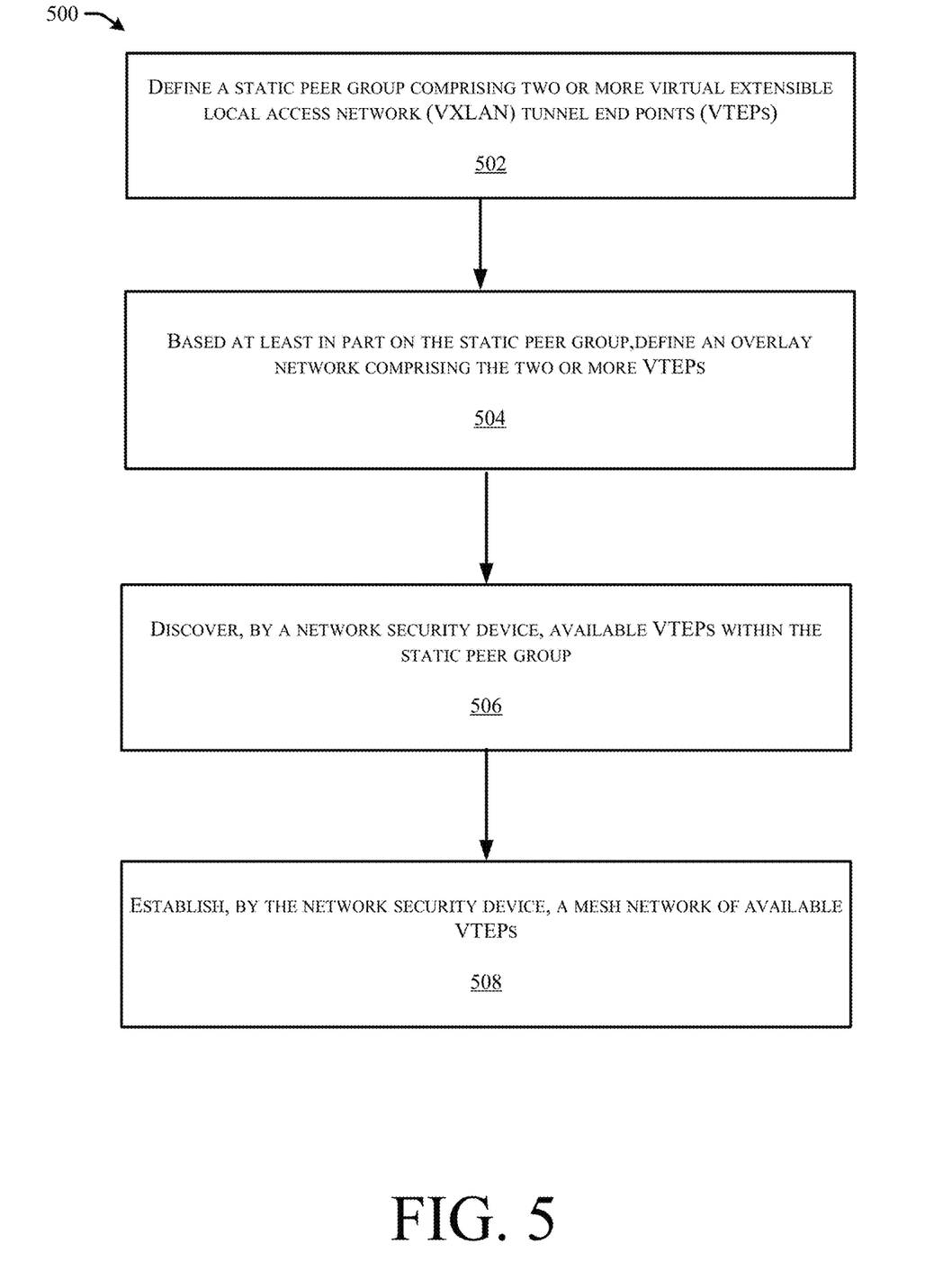
FIG. 5 illustrates a flow diagram of an example method for providing VXLAN multicast support in private cloud/on-premises networks and public cloud networks.

FIG. 5 illustrates a flow diagram of example method 300 and illustrates aspects of the functions performed at least partly by a network device of a network as described with respect to FIGS. 1-4. The logical operations described herein with respect to FIG. 5 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 5 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 5 illustrates a flow diagram of an example method 300 for providing virtual extensible local access network (VXLAN) multicast support in private cloud/on-premises networks and public cloud networks. In some examples, the method 300 may be performed at least partly by a system comprising one or more processors and one or more non-transitory computer-readable media storing computer-executable instructions that, when executed by the one or more processors, cause the one or more processors to perform the method 300.

At 502, a static peer group is defined comprising two or more virtual extensible local access network (VXLAN) tunnel end points (VTEPs). The two or more VTEPs may each comprise a data interface. For example, the static peer group may be defined comprising (i) at least one VTEP, e.g., VTEP 130, having a first internet protocol (IP) address in a first network, e.g., first network 104, and (ii) at least one VTEP having a second internet protocol (IP) address in a first public cloud network, e.g., second network 106, different from the first network. In configurations, the first network is an on-premises network. In other configurations, the first network is a second public cloud network.

In another example, the static peer group may be defined within the overlay network, e.g., the overlay network 124, as a network object group of IP addresses within at least one of a first network or a first public cloud network. In another example, the static peer group may be defined within the overlay network, e.g., the overlay network 124, as a range of IP addresses within at least one of a first network or a first public cloud network. In another example, the static peer group may be defined within the overlay network, e.g., the overlay network 124, as a subnet of IP addresses within at least one of a first network or a first public cloud network.

At 504, based at least in part on the static peer group, an overlay network is defined comprising the two or more VTEPs. At 506, a network security device discovers available VTEPs within the static peer group. For example, the network security device, e.g., a network security device 114, may discover available VTEPs within the static peer group by mimicking broadcast using unicast. At 508, the network security device establishes a mesh network of available VTEPs.

Figure 6:
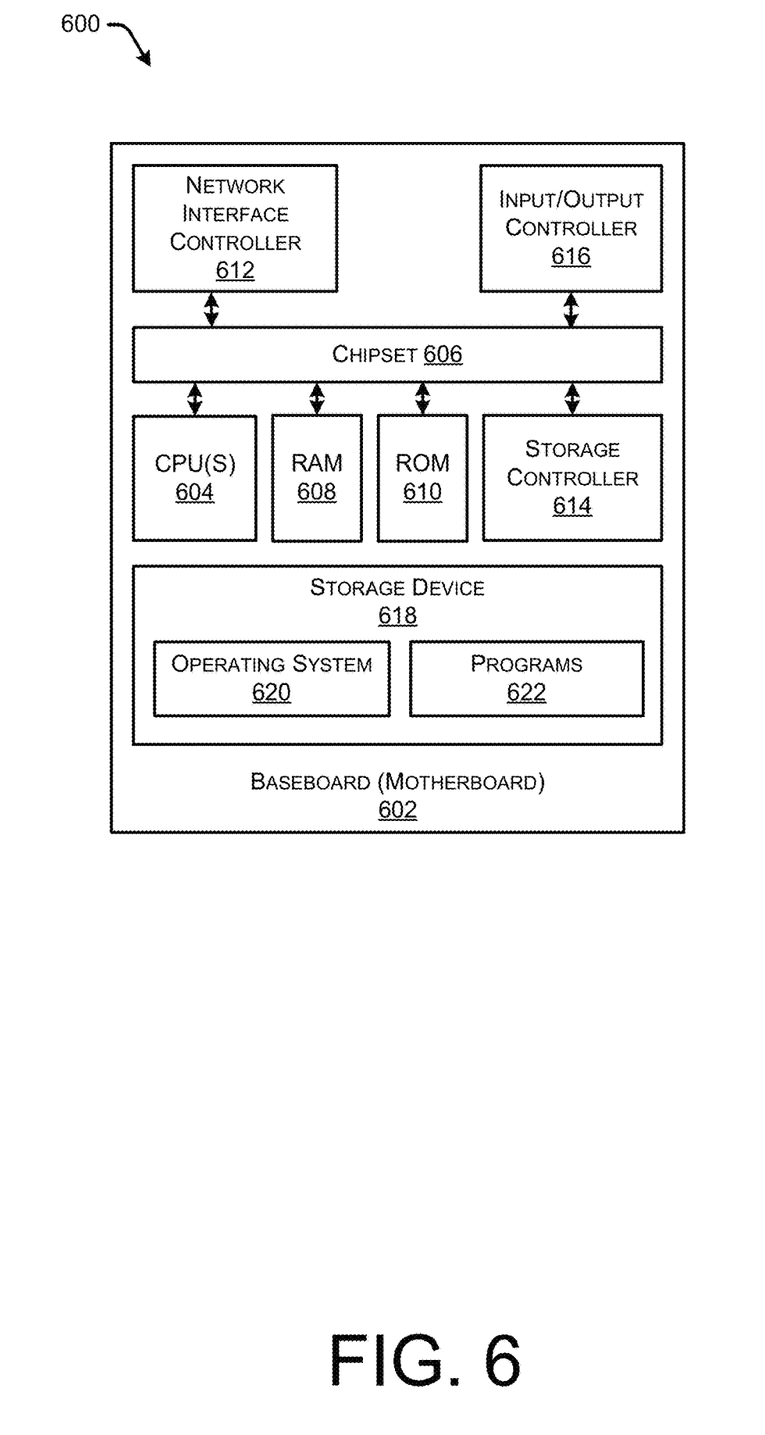
FIG. 6 is a computer architecture diagram showing an example computer hardware architecture for implementing a device that can be utilized to implement aspects of the various technologies presented herein.

FIG. 6 shows an example computer architecture for a computing device 600 capable of executing program components for implementing the functionality described above. In configurations, one or more of the computing devices 600 may be used to implement one or parts of the UCS 110, for example, the network security device 114, for example. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 600 may, in some examples, correspond to a physical devices or resources described herein.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network, such as the network 608. The chipset 606 can include functionality for providing network connectivity through a Network Interface Controller (NIC) 612, such as a gigabit Ethernet adapter. The NIC 612 is capable of connecting the computing device 600 to other computing devices over the network 608. It should be appreciated that multiple NICs 612 can be present in the computing device 600, connecting the computer to other types of networks and remote computer systems.

The computing device 600 can be connected to a storage device 618, computer-readable storage media, that provides non-volatile storage for the computer. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by the cloud network, and or any components included therein, may be supported by one or more devices similar to computing device 600. Stated otherwise, some or all of the operations described herein may be performed by one or more computing devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIGS. 1-5. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

The computing device 600 may support a virtualization layer, such as one or more virtual resources executing on the computing device 600. In some examples, the virtualization layer may be supported by a hypervisor that provides one or more virtual machines running on the computing device 600 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
defining a static peer group comprising two or more virtual extensible local access network (VXLAN) tunnel end points (VTEPs), wherein each of the two or more VTEPs comprise a data interface;
based at least in part on the static peer group, defining an overlay network comprising the two or more VTEPs;
discovering, by a network security device, available VTEPs within the static peer group; and
establishing, by the network security device, a mesh network of available VTEPs.

2. The method of claim 1, wherein discovering, by the network security device, available VTEPs within the static peer group comprises mimicking broadcast using unicast.

3. The method of claim 1, wherein defining the static peer group comprising two or more VTEPs comprises defining the static peer group comprising (i) at least one VTEP having a first internet protocol (IP) address in a first network and (ii) at least one VTEP having a second internet protocol (IP) address in a first public cloud network different from the first network.

4. The method of claim 3, wherein the first network is an on-premises network.

5. The method of claim 3, wherein the first network is a second public cloud network.

6. The method of claim 1, wherein defining the static peer group comprises defining, within the overlay network, a network object group of IP addresses within at least one of a first network or a first public cloud network.

7. The method of claim 1, wherein defining the static peer group comprises defining, within the overlay network, a range of IP addresses within at least one of a first network or a first public cloud network.

8. The method of claim 1, wherein defining the static peer group comprises defining, within the overlay network, a subnet of IP addresses within at least one of a first network or a first public cloud network.

9. The method of claim 1, wherein each data interface is located within a corresponding network security device.

10. A system comprising:
one or more processors; and
one or more non-transitory computer-readable media storing computer-executable instructions that, when executed by the one or more processors, cause the one or more processors to perform actions comprising:
defining a static peer group comprising two or more virtual extensible local access network (VXLAN) tunnel end points (VTEPs), wherein each of the two or more VTEPs comprises a data interface;
based at least in part on the static peer group, defining an overlay network comprising the two or more VTEPs;
discovering, by a network security device, available VTEPs within the static peer group; and
establishing, by the network security device, a mesh network of available VTEPs.

11. The system of claim 10, wherein discovering, by the network security device, available VTEPs within the static peer group comprises mimicking broadcast using unicast.

12. The system of claim 10, wherein defining the static peer group comprising two or more VTEPs comprises defining the static peer group comprising (i) at least one VTEP having a first internet protocol (IP) address in a first network and (ii) at least one VTEP having a second internet protocol (IP) address in a first public cloud network different from the first network.

13. The system of claim 12, wherein the first network is an on-premises network.

14. The system of claim 12, wherein the first network is a second public cloud network.

15. The system of claim 10, wherein defining the static peer group comprises defining, within the overlay network, a network object group of IP addresses within at least one of a first network or a first public cloud network.

16. The system of claim 10, wherein defining the static peer group comprises defining, within the overlay network, a range of IP addresses within at least one of a first network or a first public cloud network.

17. The system of claim 10, wherein defining the static peer group comprises defining, within the overlay network, a subnet of IP addresses within at least one of a first network or a first public cloud network.

18. The system of claim 10, wherein each data interface is located within a corresponding network security device.

19. A method comprising:
defining a static peer group comprising a plurality of virtual extensible local access network (VXLAN) tunnel end points (VTEPs), wherein each VTEP comprises a network security device that includes a data interface, and wherein (i) at least one VTEP of the plurality of VTEPs has a first internet protocol (IP) address in a network and (ii) at least one VTEP of the plurality of VTEPs has a second internet protocol (IP) address in a public cloud network different from the network;
based at least in part on the static peer group, defining an overlay network comprising the plurality of VTEPs;
mimicking broadcast using unicast, by a first network security device of a first VTEP, to discover available VTEPs within the static peer group; and
establishing, by the first network security device, a mesh network of available VTEPs.

20. The method of claim 19, wherein defining the static peer group comprising the plurality of VTEPs comprises (i) at least one VTEP having the first IP address in the network and (ii) at least one VTEP having the IP address in the public cloud network comprises defining, within the overlay network, a network object group of IP addresses within the public cloud network.

* * * * *